US011947053B2

United States Patent
Kenig et al.

(10) Patent No.: US 11,947,053 B2
(45) Date of Patent: Apr. 2, 2024

(54) WEIGHTING DETECTOR CONFIGURATIONS IN SPECT IMAGING

(71) Applicant: MOLECULAR DYNAMICS LIMITED, Hamilton (BM)

(72) Inventors: Tal Kenig, Avihayil (IL); Zvi Devir, Haifa (IL)

(73) Assignee: Molecular Dynamics Limited, Hamilton (BM)

( * ) Notice: Subject to any disclaimer, the term of this patent is extended or adjusted under 35 U.S.C. 154(b) by 0 days.

(21) Appl. No.: 18/095,275

(22) Filed: Jan. 10, 2023

(65) Prior Publication Data

US 2023/0152474 A1    May 18, 2023

Related U.S. Application Data

(63) Continuation of application No. 17/586,847, filed on Jan. 28, 2022, now Pat. No. 11,579,315, which is a continuation of application No. 16/484,191, filed as application No. PCT/IL2018/050129 on Feb. 6, 2018, now Pat. No. 11,249,198.

(60) Provisional application No. 62/455,609, filed on Feb. 7, 2017.

(51) Int. Cl.
    *G01T 1/166*    (2006.01)
    *G01T 1/164*    (2006.01)

(52) U.S. Cl.
    CPC ........... *G01T 1/1663* (2013.01); *G01T 1/164* (2013.01)

(58) Field of Classification Search
    CPC ....................... G01T 1/1663; G01T 1/164
    See application file for complete search history.

(56) References Cited

U.S. PATENT DOCUMENTS

| | | | | |
|---|---|---|---|---|
| 6,147,353 | A * | 11/2000 | Gagnon | G01T 1/1648 |
| | | | | 250/363.04 |
| 11,249,198 | B2 * | 2/2022 | Kenig | G01T 1/164 |
| 11,579,315 | B2 * | 2/2023 | Kenig | G01T 1/1663 |
| 2008/0087833 | A1 | 4/2008 | McCroskey et al. | |
| 2009/0003655 | A1 * | 1/2009 | Wollenweber | G06T 7/20 |
| | | | | 382/107 |

FOREIGN PATENT DOCUMENTS

| | | |
|---|---|---|
| EP | 0747730 A2 | 12/1996 |
| WO | 9954756 A1 | 10/1999 |

OTHER PUBLICATIONS

Search Report dated May 14, 2018 for PCT Appn. No. PCT/IL2018/050129, 3 pgs.
Non-Final Office Action dated Apr. 21, 2021 for U.S. Appl. No. 16/484,191, 13 pgs.

\* cited by examiner

*Primary Examiner* — David P Porta
*Assistant Examiner* — Meenakshi S Sahu
(74) *Attorney, Agent, or Firm* — Brooks Kushman P.C.

(57) ABSTRACT

Method and apparatus for scanning a region of interest (ROI) by a gamma detector. An exemplary method includes determining, for each of multiple detector configurations, a respective weight based on an absorption profile, associating each of a plurality of portions of the ROI with a respective gamma attenuation value; and detecting gamma radiation from multiple detector configurations for time periods allocated among the detector configurations based on the weights determined.

11 Claims, 7 Drawing Sheets

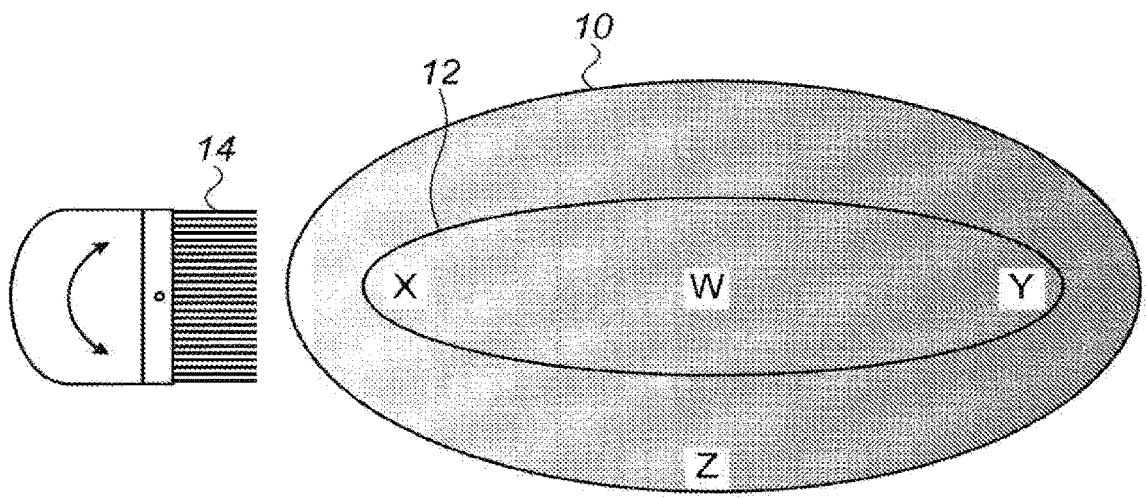
*FIG. 1A*
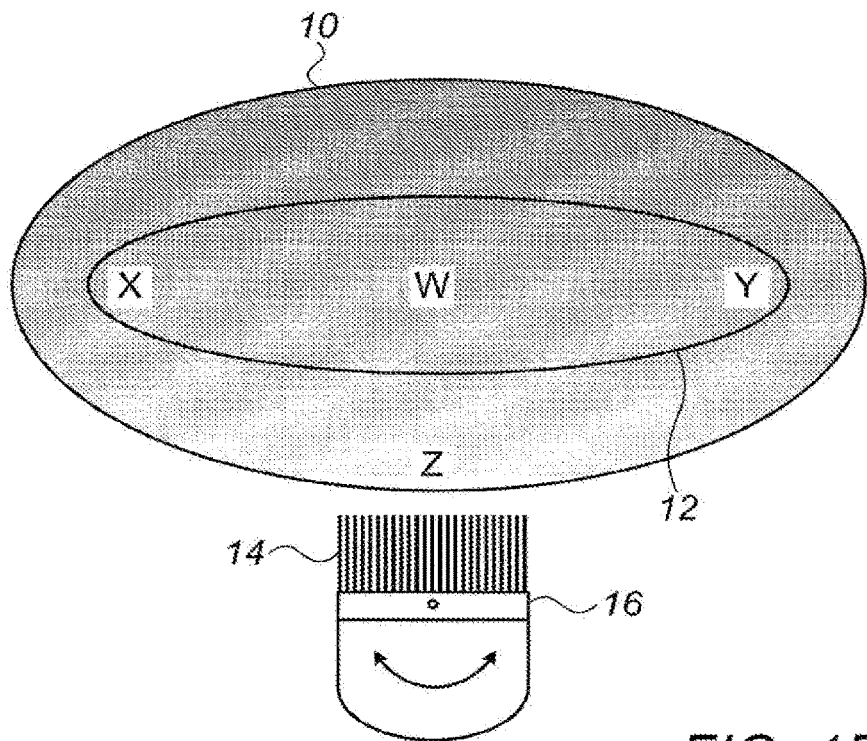
*FIG. 1B*
*FIG. 2*
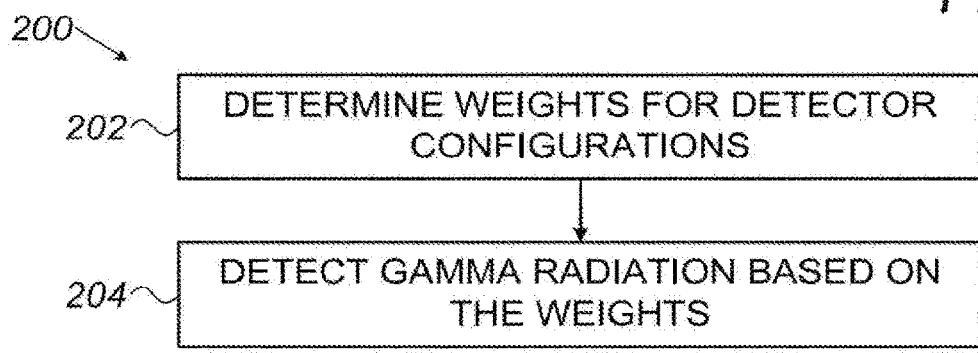

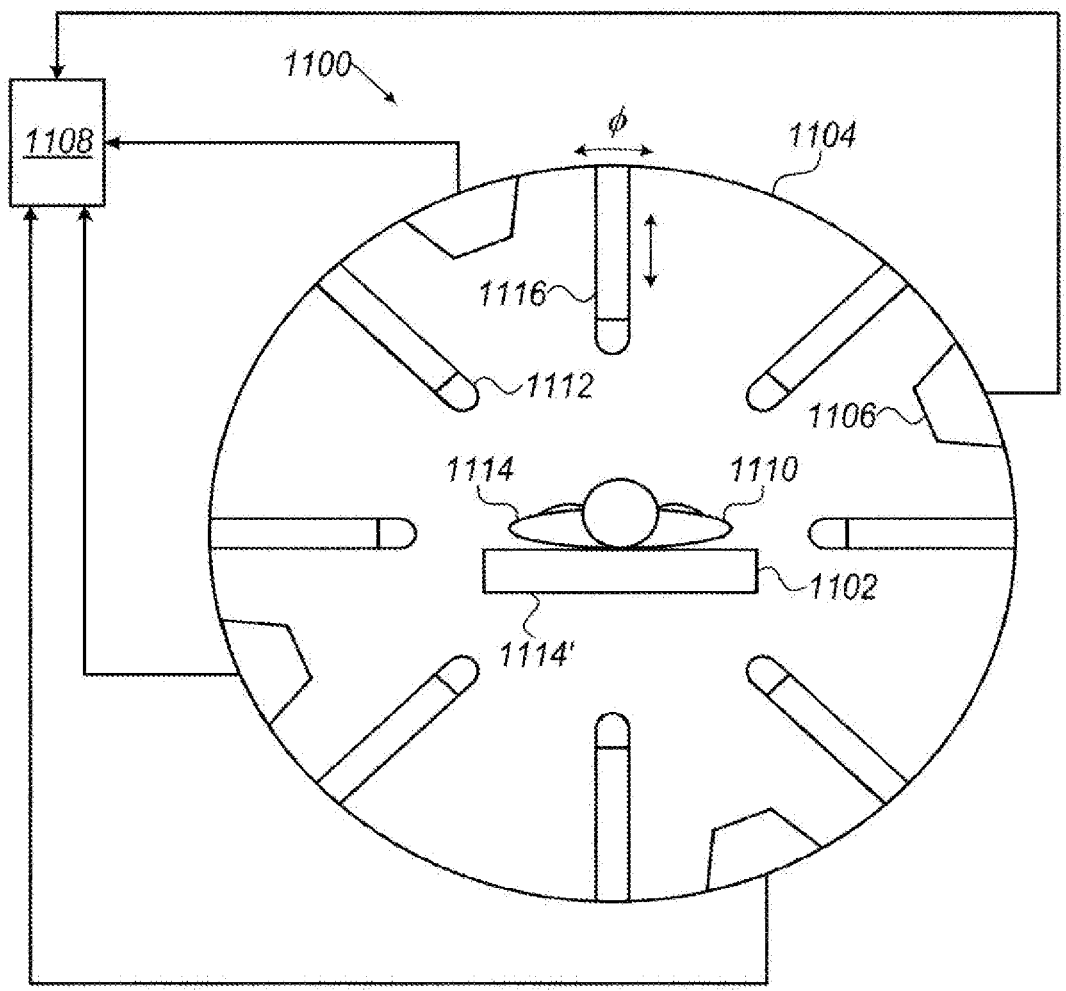
*FIG. 6A*
*FIG. 6B*
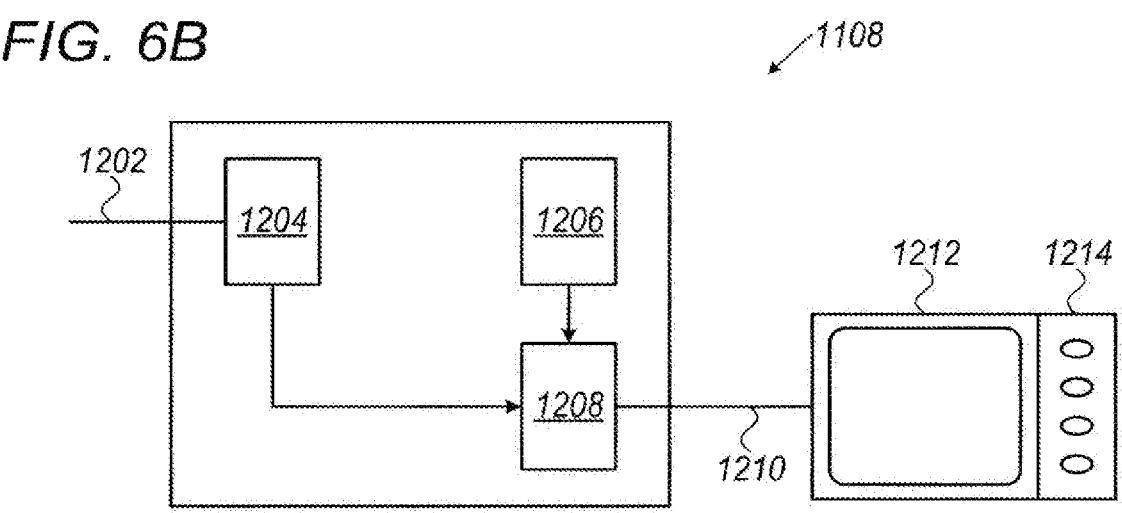

WEIGHTING DETECTOR CONFIGURATIONS IN SPECT IMAGING

CROSS-REFERENCE TO RELATED APPLICATIONS

This application is a continuation of U.S. application Ser. No. 17/586,847 filed Jan. 28, 2022, now U.S. Pat. No. 11,579,315 issued Feb. 14, 2023, which is a continuation of U.S. application Ser. No. 16/484,191 filed Aug. 7, 2019, now U.S. Pat. No. 11,249,198 issued Feb. 15, 2022, which is the U.S. national phase of PCT Application No. PCT/IL2018/050129 filed on Feb. 6, 2018, which claims the benefit of U.S. Provisional Patent Application No. 62/455,609 filed on Feb. 7, 2017, the disclosures of which are incorporated in their entireties by reference herein.

FIELD OF THE INVENTION

The present disclosure is in the field of imaging by gamma radiation, and more particularly, but not exclusively, in the field of single photon emission computerized tomography (SPECT).

BACKGROUND OF THE INVENTION

In traditional SPECT imaging, a large gamma detector, weighing typically about 500 kg, and having about half a meter in diameter or diagonal, is brought near a patient for detecting gamma photons emitted from the patient (who before was injected with a gamma emitting material, also known as radiopharmaceutical). This large and heavy gamma detector collects gamma photons for some time, and then moves to another position, for detecting gamma photons from a different side of the patient's body.

Recently, smaller and lighter gamma detectors have become commercially available, usually based on Cadmium Zinc Telluride (CZT) crystals.

SUMMARY OF THE INVENTION

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider.

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such as measuring dielectric properties of a tissue might be expected to use completely different methods, e.g., making use of expert knowledge and/or the pattern recognition capabilities of the human brain, which would be vastly more efficient than manually going through the steps of the methods described herein.

A broad aspect of some embodiments of the invention includes a method of scanning, by a gamma detector, a region of interest (ROI). The method includes:

determining, for each of multiple detector configurations, a respective weight, The weight is determined based on an absorption profile that associates each of a plurality of portions of the ROI with a respective gamma attenuation value. The method further includes detecting gamma radiation from multiple detector configurations for time periods allocated among the detector configurations based on the weights determined.

In some embodiments, the multiple detector configurations comprise a plurality of configuration sets, wherein a configuration set is a group of configurations that differ only in one configuration describing parameter.

In some such embodiments, each detector configuration within a configuration set is allocated the same period of time, and each configuration set is allocated a time corresponding to the weights. Additionally or alternatively, different detector configurations within a configuration set are allocated different period of times according to the weights.

Some embodiments include sweeping continuously among multiple configurations in a configuration set at sweeping speeds corresponding to the weights.

In some embodiments, each detector configuration within a configuration set is allocated the same period of time, and the number of configurations in the configuration set corresponds to the weights.

In some embodiments, the method includes detecting gamma radiation from multiple detector configurations based on the weights determined comprises devoting more time to detecting gamma radiation with the gamma detector facing the ROI from a direction along which attenuation between the gamma detector and the ROI is higher than to detecting gamma radiation with the gamma detector facing the ROI from a direction along which attenuation between the gamma detector and the ROI is lower.

In some embodiments, the weights are used to determine acquisition durations.

In some such embodiments, for each of the multiple detector configurations:

the gamma detector is brought to the detector configuration; and gamma radiation is detected for the acquisition duration corresponding to the weight determined for the detector configuration.

In some embodiments, the weights are used to determine movement speeds of the detectors.

In some such embodiments, a detector moves continuously among the multiple detector configurations at moving speeds that correspond to the weights.

In some embodiments, at least one detector is swept continuously among a first plurality of detector configurations at a first sweeping pace, and among a second plurality of detector configurations at a second sweeping pace.

In some embodiments, a weight determined to a given detector configuration is used to determine a configuration density in the vicinity of the given detector configuration.

In some embodiments, the method includes, for each of the multiple detector configurations:

(a) bringing the gamma detector to the detector configuration;

(b) detecting gamma radiation at the detector configuration;

(c) bringing the gamma detector to a new detector configuration between the detector configuration and another one of the multiple detector configurations;

(d) detecting gamma radiation at the new detector configuration; and (e) repeating (c) and (d) a number of times, said number being dependent on the weight determined for the detector configuration.

In some embodiments, determining a weight for a specific detector configuration includes estimating a total attenuation from a point in the ROI to a point in the gamma detector when the gamma detector is in the specific detector configuration.

In some embodiments, determining a weight for a specific detector configuration includes estimating a total attenuation from each of a plurality of points in the ROI to a corresponding point in the gamma detector when the gamma detector is in the specific detector configuration, and combining the total evaluations estimated for the plurality of points in the ROI to provide the weight.

In some such embodiments, the combining includes summing. In some embodiments, the combining may include finding an order statistic of a distribution of attenuations estimated for all the points in the gamma detector.

In some embodiments, the method also includes generating the absorption profile. For example, the absorption profile may be generated based on a CT scan, input from 3D sensors, and/or a SPECT preview scan.

An aspect of some embodiments of the invention includes an apparatus for scanning a region of interest (ROI). The apparatus includes:
- a gamma detector controllable to be at multiple detector configurations; and
- a processor configured to:
    - determine for each of the multiple detector configurations of the gamma detector a respective weight based on an absorption profile, the absorption profile comprising an association of each of a plurality of portions of the ROI with a respective gamma attenuation value; and
    - control the gamma detector to detect gamma radiation from multiple detector configurations based on the weights determined.

In some embodiments, the processor is configured to control the gamma detector to devote more time to detecting gamma radiation with the gamma detector facing the ROI from a direction along which attenuation between the gamma detector and the ROI is higher than to detecting gamma radiation with the gamma detector facing the ROI from a direction along which attenuation between the gamma detector and the ROI is lower.

In some embodiments, the weights correspond to acquisition durations, and the processor is configured to execute the following tasks in respect to each of multiple detector configurations:
- bring the gamma detector to the detector configuration; and
- control the gamma detector to detect gamma radiation for the acquisition duration corresponding to the weight determined for the detector configuration.

In some embodiments, the weights correspond to sweeping paces, and the processor is configured to control the gamma detector to sweep continuously among multiple detector configurations at paces based on the weights.

For example, the processor may be configured to control the gamma detector to sweep continuously among a first plurality of detector configurations at a first sweeping pace, and among a second plurality of detector configurations at a second sweeping pace.

In some embodiments, the processor is configured to execute the following in respect of each of multiple selected detector configurations:
- (a) bring the gamma detector to the selected detector configuration;
- (b) control the gamma detector to detect gamma radiation at the selected detector configuration;
- (c) bring the gamma detector to a non-selected detector configuration, the non-selected detector configuration being in the vicinity of the selected detector configuration;
- (d) control the gamma detector to detect gamma radiation at the non-selected detector configuration; and
- (e) repeat (c) and (d) a number of times, each with a different non-selected detector configuration in the vicinity of the selected detector configuration. The said number of times may be dependent on the weight determined for the selected detector configuration.

In some embodiments, the processor is configured to obtain the absorption profile from a CT scan.

In some such embodiments, the apparatus also includes a CT scanner, and the processor is configured to control the CT scanner to scan the ROI; and analyze a resultant scan to obtain the absorption profile.

In some embodiments, the detector configuration includes position of the gamma detector, orientation of the gamma detector, or both position and orientation of the gamma detector.

In some embodiments, the apparatus includes a gantry, and the detector configuration includes a gantry angle.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1A and FIG. 1B are diagrammatic illustrations of a region of interest being a part of a body part, as viewed by a gamma detector from different detector configurations;

FIG. 2 is a flowchart of a method for scanning a region of interest (ROI), by a gamma detector according to some embodiments of the invention;

FIG. 6A is a diagrammatic presentation of an apparatus for scanning a region of interest (ROI) according to some embodiments of the invention;

FIG. 6B is a diagrammatic presentation of a processor according to some embodiments of the invention;

DETAILED DESCRIPTION

Figure 3A:
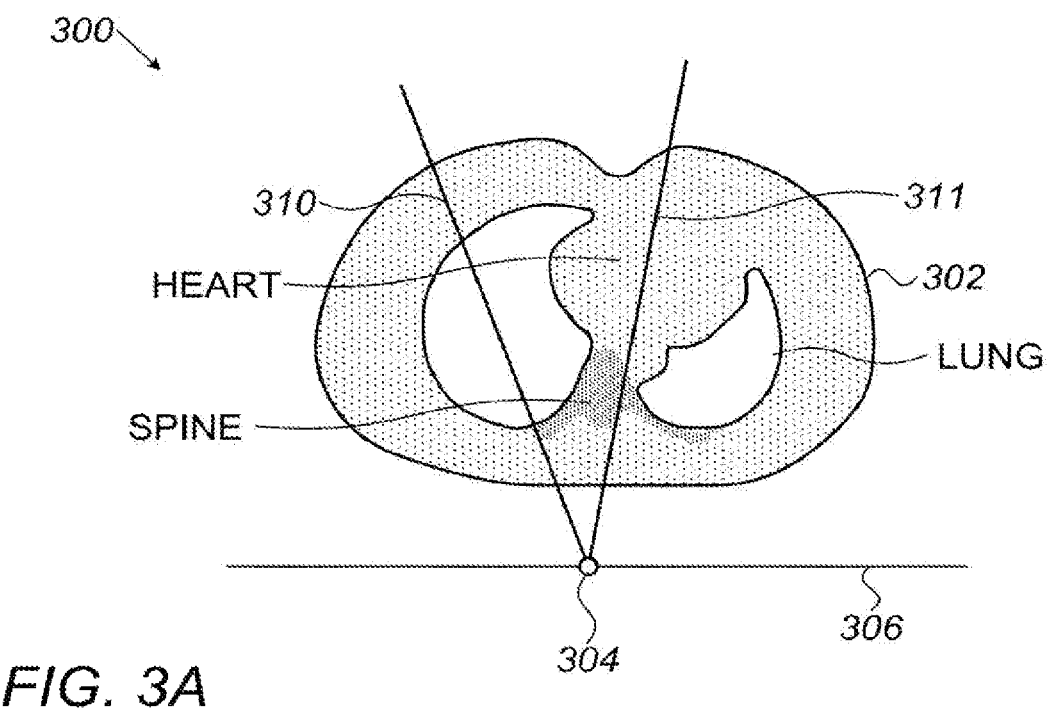
FIG. 3A is an exemplary attenuation profile.

An aspect of some embodiments of the invention includes a method of scanning a region of interest in a patient. The region of interest may be, any organ, tissue, or organ part, or body region. For example, the patient's brain, a certain part inside the brain (e.g., the basal ganglia), the patient's liver, kidney, spine, bones, thyroid, parathyroid, lungs, lymphatic system, etc. While the clinically interesting region (also referred to herein as region of interest, or ROI) may be relatively small, the region scanned in practice may be larger. Scanning a larger region has two main benefits: providing a context to the image of the region of interest, and reducing artifacts. Ideally, every emitter within the patient's body is scanned from every possible angle.

While in many cases the scanning is carried out by multiple gamma detectors at the same time (e.g., 4, 6, 8, 12 detectors, or intermediate number), the present disclosure refers to a single detector, under the understanding that the same principles may apply to operating each one of the detectors.

The gamma detector may have several configurations. A configuration of the gamma detector may define the spatial relation between the detector and the body of the patient. The spatial relationship may be defined by one or more configuration describing parameters. For example, in some embodiments, the gamma detector is mounted on an extendable arm, that can extend towards and away of the patient. The distance from the patient may form part of the gamma detector configuration and may be considered a configuration describing parameter. Similarly, the extent to which the extendable arm is extended may form part of the gamma detector configuration and may be considered a configuration describing parameter. In some embodiments, the extendable arm is supported on a gantry that may be rotated around the patient to various angles. The gantry angle may form part of the gamma detector configuration and may be considered a configuration describing parameter. In some embodiments, even in the absence of a revolving gantry, the gamma detector may be positioned in different angles in respect to the patient, e.g., facing the nose, facing the left ear, etc. In some embodiments, these facing angles may form part of the gamma detector configuration and may be considered a configuration describing parameter. In some embodiments, the gamma detector is mounted on the extendable arm so the detector can swivel with respect to the arm. The swivel angle may also form a part of the detector configuration. In some embodiments, the gamma detector configuration may be represented by a vector, the different components of which represent different configuration describing parameters, for example, gantry angle, swivel angle, distance from the patient, etc.

In some embodiments, detector configurations that differ in only one configuration describing parameter (e.g., differ only in swivel angle) are considered as a set of detector configurations, also referred herein as a configuration set. For example, in some embodiments, a configuration set includes a group of detector configurations having a common distance from the patient and gantry angle, and differ only in swivel angle. In some embodiments, the configuration set includes all the detector configurations that differ in only one configuration describing parameter.

In some embodiments, the region of interest may be scanned by each gamma detector from multiple detector configurations. For example, one gamma detector may be used for some time period at a certain gantry angle and swivel angle, and then swivel to another swivel angle for another time period. An aspect of some embodiments of the invention includes methods for allocating scanning time between detector configurations. For example, a scan carried out with equal time periods allocated to all detector configurations, may result in varying image quality, where the outer parts of the imaged body part are reconstructed with higher image quality compared to the inner parts. The inventors suggested that this effect has to do with attenuation of the gamma radiation on its way from the inner parts to the detector, which was more significant than the attenuation of the gamma radiation on its way from the outer parts to the gamma detector.

Thus, a region of interest may have "hidden" regions, and "visible" regions. A region may be considered "visible" if gamma radiation emitted from the region goes under only minimal attenuation on its way to the detector. A region may be considered "hidden" if gamma radiation emitted from the region goes under significant attenuation on its way to the detector. More specifically, the "visibility" depends on the total gamma attenuation along the path between the photon emission sight and the detector. As apparent from these definitions, being "visible" or "hidden" is not an intrinsic property of the emitting site, but depends also on the location of the detector and the attenuating media.

The concepts of hidden and visible regions are illustrated in FIGS. 1A and 1B, which are diagrammatic illustrations of a body part 10 having therein a region of interest 12, scanned by detector 14 at two configurations: configuration A in FIG. 1A and configuration B at FIG. 1B. Assuming that body part 10 is homogeneous, one can see that in respect to configuration A (i.e., in FIG. 1A), ROI 12 has a very visible portion X, and a portion Y of very high hiddenness. In respect to configuration B (i.e., in FIG. 1B), both portions X and Y are out of the field of view of the detector. However, if the detector may swivel to face these portions (e.g., in respect to point 16, as shown by the arrow), then, when directly facing the detector, portions X and Y are similarly visible, at some intermediate level between the visibility level of X and Y in respect to configuration A.

To cope with the problem that more hidden regions are imaged at lower quality under equal allocation of scanning time between detector configurations, the inventors suggested spending more of the scanning time at configurations where the ROI is hidden then at configurations where the ROI is visible. The visibility of an ROI as viewed by a detector at a specified configuration may be estimated by various methods, some of which are described below, from an absorption profile of the ROI at the specified configuration. The absorption profile may also include data on body portions out of the ROI, particularly those residing within the photon travel path, such as spot Z.

Looking at FIG. 1A and FIG. 1B from another perspective, every detector configuration has its own visible spots and hidden spots. For example, in configuration A, spot X is the most visible, then Z and then Y; and in configuration B, spot Z is most visible then spots X and Y. So for each spot, each detector configuration may have a different "visibility" value.

Since spot Z is out of the ROI, its degree of visibility may be irrelevant for allocating scanning time, at least in some embodiments. It may also happen that spots X and Y are out of the field of view of detector 14 when in configuration 8, so they may be irrelevant for allocating scanning time to configuration A, at least in some embodiments. Thus, in some embodiments, to allocate scanning time between configurations A and B, the visibility of parts X, W, and Z, in respect of configuration B are taken into account, and the visibility of part W in respect to configuration A is taken into account.

Quantitatively, the degree of visibility of a point in respect to a specific detector configuration may be represented by a gamma attenuation value, indicating the attenuation of gamma radiation on its way to the detector from the point. The gamma attenuation values assigned to ROI points within the field of view of the detector at a given configuration may then be combined for a single weight associated with the given detector configuration. This weight may be taken into consideration in allocating the scanning time among the detector configurations.

Thus, a scanning method according to some embodiments of the present invention includes determining, for each of multiple detector configurations, a respective weight based on an absorption profile associating each of a plurality of portions of the ROI with a respective gamma attenuation value; and detecting gamma radiation from multiple detector configurations for time periods allocated among the detector configurations based on the weights determined.

In some embodiments, the time periods are so allocated, that time allocated to scan hidden portions of the ROI is larger than time allocation to scan visible portions of the ROI.

In some embodiments, the weights correspond to acquisition durations. For example, for each of multiple specific detector configurations taking part in the scanning, the gamma detector may be first brought to the configuration, and then detect gamma radiation for an acquisition duration corresponding to the weight determined for the specific detector configuration. As used herein, two quantities, A and B correspond to each other if each A has a matching B, and similar As have matching Bs that are similar to each other. In some embodiments, correspondence may take the form of a linear equation (e.g., $B=pA+q$), or other monotonous and differentiable equation (e.g., $8=1/A$) that allows determining B for a given A. In some embodiments, values are similar if they differ from each other by 10% or less of the larger one.

In some embodiments, the weights correspond to motion speeds. For example, in some such embodiments, the scanning may include moving continuously among multiple detector configurations at differing motion speeds. In some embodiments, movement over a first group of detector configurations may be at a first single, constant, pace, and moving over a second group of detector configurations may be at a second single, constant, pace, different than the first. In some embodiments, the two groups of detector configurations are swept continuously; in some embodiments, there is an intermission between the sweeping of the two groups.

In some embodiments, the weights may correspond to a configuration density in the vicinity of the detector configuration. For example, detection may take place at many configurations that differ only slightly from one another (e.g., in swivel angle) when looking at a hidden region, and at fewer configurations, that differ more significantly from each other (e.g., in the swivel angle), when looking at a visible region. In some such embodiments, the time spent at each configuration is the same.

In some embodiments, assigning the same weight to all the configurations within a configuration set results in each configuration being allocated the same time and the configuration density being uniform. Equal weights in embodiments where the detectors move continuously along the configurations may result in constant movement speed.

In some embodiments, assigning different weights to different configurations in a configuration set results in assigning different acquisition times to the different configurations. The configuration density in the set may be uniform (e.g., the swivel angel may change by a constant amount from one configuration to the following one in the set).

In some embodiments, assigning different weights to different configurations in a configuration set results in different configuration density. For example, if a first configuration (say, of swivel angle=30°) has a higher weight than a second configuration (say, of swivel angle=60), detection may take place at more configurations around the first (e.g., at 36°, 33°, 27°, and 24°) than around the second (e.g., 55° and 65°). In some such embodiments, the acquisition times allotted to each configuration may be the same.

In some embodiments, the detector sweeps across various configurations continuously, and assigning larger weight to a certain configuration in a configuration set may cause the detector to go more slowly around this configuration, while assigning a smaller weight cause the detector to go more swiftly around this configuration.

It is to be understood that in some embodiments, higher weight may cause paying more time, density, or slowness, while in other embodiments, higher weights may cause paying less time, density, or slowness. However, in all embodiments, higher absorption (i.e., lower visibility) is connected through the weights to longer acquisition times, higher configuration density, or slower movement.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 2 is a flowchart of a method 200 for scanning a region of interest (ROI), by a gamma detector. Method 200 includes two main parts: associating each detector configuration with a weight; and detecting gamma radiation from multiple detector configurations based on these weights.

For example, method 200 may include a step 202 of determining a respective weight for each of multiple detector configurations. The weights may be determined based on an absorption profile of the ROI. The absorption profile may include a representation of the ROI divided into portions. In some embodiments, the portions may overlap with one another. In some embodiments, the portions are mutually exclusive. In some embodiments, the totality of the portions covers each and every bit of the region of interest. In some embodiments, the totality of the portions covers the ROI only partially. The absorption profile may also include an association between each of the portions and a respective gamma attenuation value. In some embodiments, some or all of the gamma attenuation values may be the same, but in many embodiments, at least two different gamma attenuation values are associated with different portions, one value with each portion.

Figure 3B:
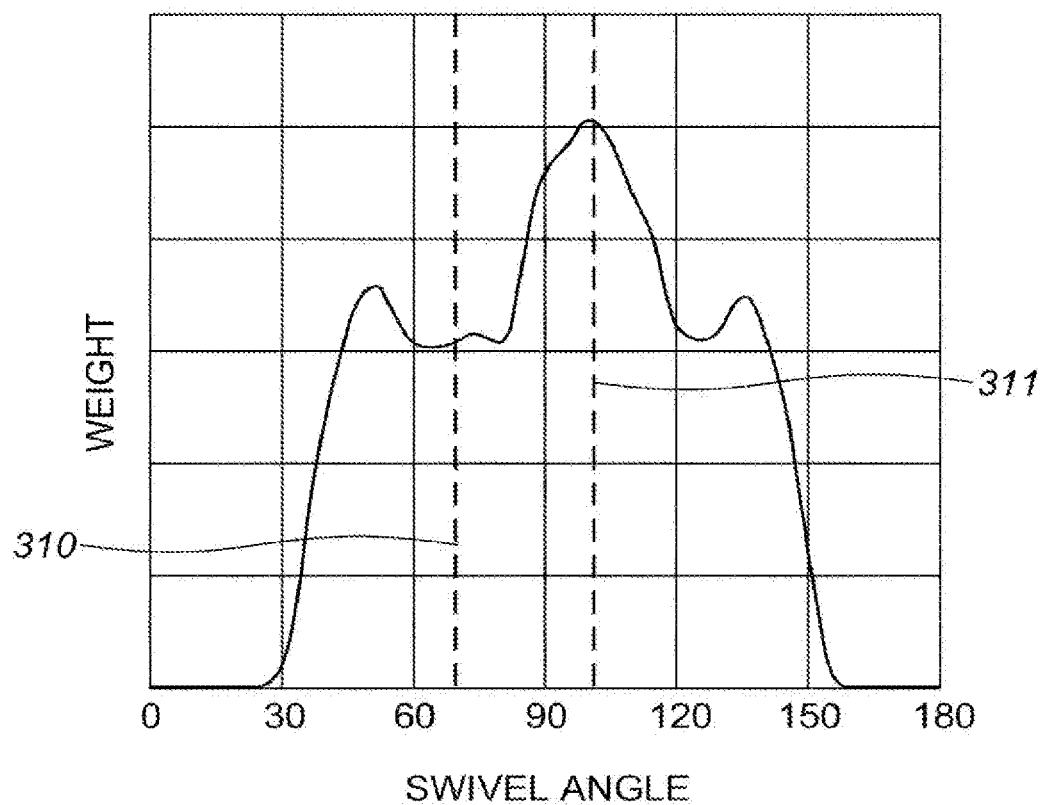
FIG. 3B is a graph showing the weights assigned to different swivel angles according to some embodiments of the invention.
Figure 3C:
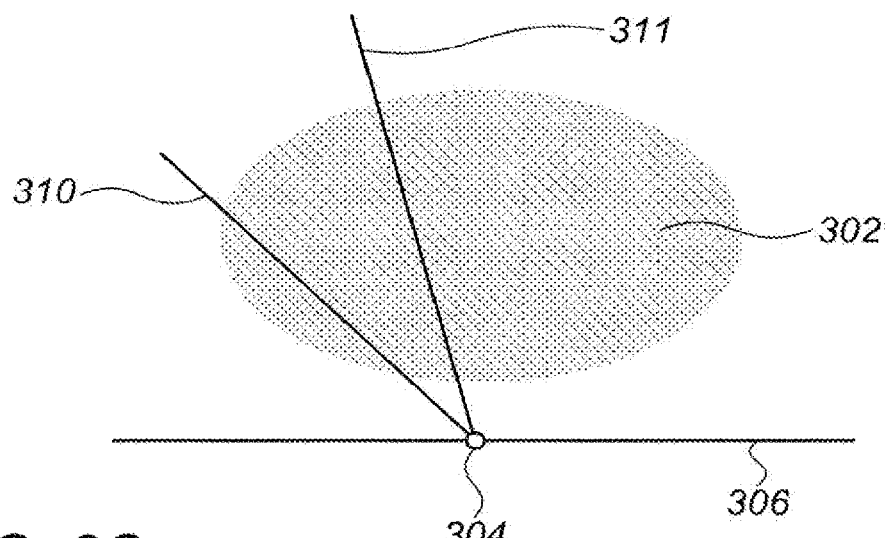
FIG. 3C is another exemplary attenuation profile.
Figure 4A:
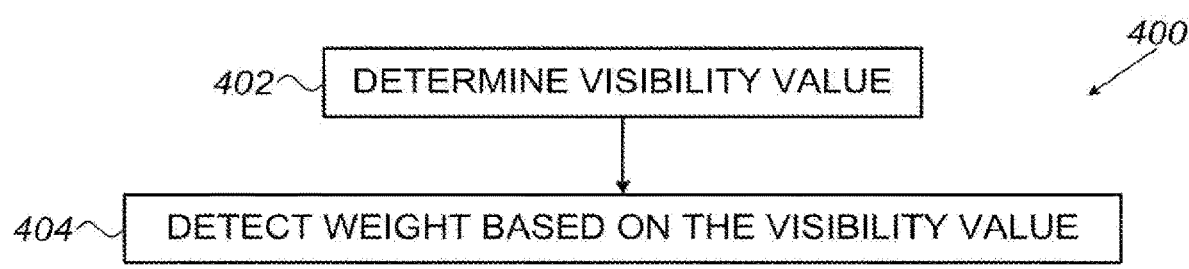
FIG. 4A is a flowchart of an exemplary method for determining a weight for a specific detector configuration according to some embodiments of the invention.

FIGS. 3A and 3C, described below, are examples of attenuation profile. FIG. 4A, described further below, is a flowchart of an exemplary method 400 for determining a weight for a specific detector configuration.

Without going into the details of any specific attenuation profile or method for determining weights, it may be explained that each weight is associated with a given portion of the ROI based on the visibility of that portion. For example, the weight may be based on the percentage of the gamma photons expected to be detected by the detector at the specific detector configuration, out of the total number of photons expected to emerge from the given portion of the ROI towards the detector. In some embodiments, it may be assumed that each photon emerging towards the detector is either detected by the detector or attenuated on the way to the detector. Accordingly, in some embodiments, the weight may be based on the percentage of the photons expected to be attenuated on their way to the detector. In some embodiments, the weights are indicative of the above-mentioned percentages. For example, the weights may be equal to a percentage described above, or be a function (e.g., injective function) thereof.

Method 200 may further include a step 204, of detecting gamma radiation from multiple detector configurations for time periods allocated among the detector configurations based on the weights determined. Without going into the details of any such specific method, it may be explained that in some embodiments, step 204 includes devoting more time to detecting gamma radiation with the detector in a configuration wherein the ROI is hidden from the detector, than in a configuration wherein the ROI is visible to the detector. For example, step 204 may include devoting more time to detecting gamma radiation with the gamma detector facing the ROI from a direction along which attenuation between the gamma detector and the ROI is higher (e.g., higher than a predetermined threshold) than to detecting gamma radiation with the gamma detector facing the ROI from a direction along which attenuation between the gamma detector and the ROI is lower (e.g., lower than the predetermined threshold). In some embodiments, there is no need to determine a threshold, and step 204 may include devoting a first time duration to detecting gamma radiation with the gamma detector facing the ROI from a direction along which attenuation between the gamma detector and the ROI has a first attenuation value and devoting a second time duration to detecting gamma radiation with the gamma detector facing the ROI from a direction along which attenuation between the gamma detector and the ROI has a second attenuation value, so that the second time duration is longer than the first time duration if the first attenuation value is higher than the second attenuation value.

This way, the visibility of the ROI to the detector at different configurations may be factored out, so that each detector configuration contributes to the scanning process a similar amount of detected photons, regardless of the visibility of the ROI to the detector at different detector configurations. In some embodiments, the final image obtained by scanning method 200 is not influenced by the visibility of different portions of the ROI to detectors at different configurations, and all portions, visible and hidden alike, are imaged at similar quality. The visibility of a portion of the ROI may be defined as an average over the visibility of that portion to different detector configurations. In some embodiments, the final image obtained by scanning method 200 is influenced by the visibility of different portions, but less than if scanning times are allocated to detector configurations regardless of the visibility of the ROI to the detector at these detector configurations. For example, the phenomenon that more hidden regions are scanned at lower quality than visible regions may maintain, but be less severe than if time is allocated to detector configuration regardless of the visibility of the region of interest to a detector in different configurations. In some embodiments, the final image obtained by scanning method 200 is influenced by the visibility of different portions, so that hidden portions are imaged at higher quality than visible portions.

Figure 5A:
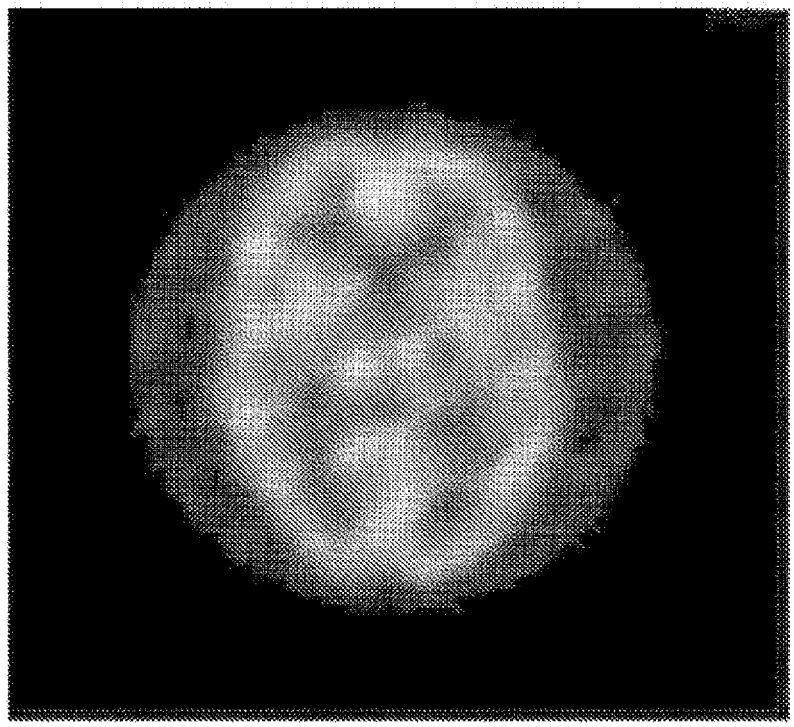
FIG. 5A is a reproduction of a SPECT scan of a head phantom.
Figure 5B:
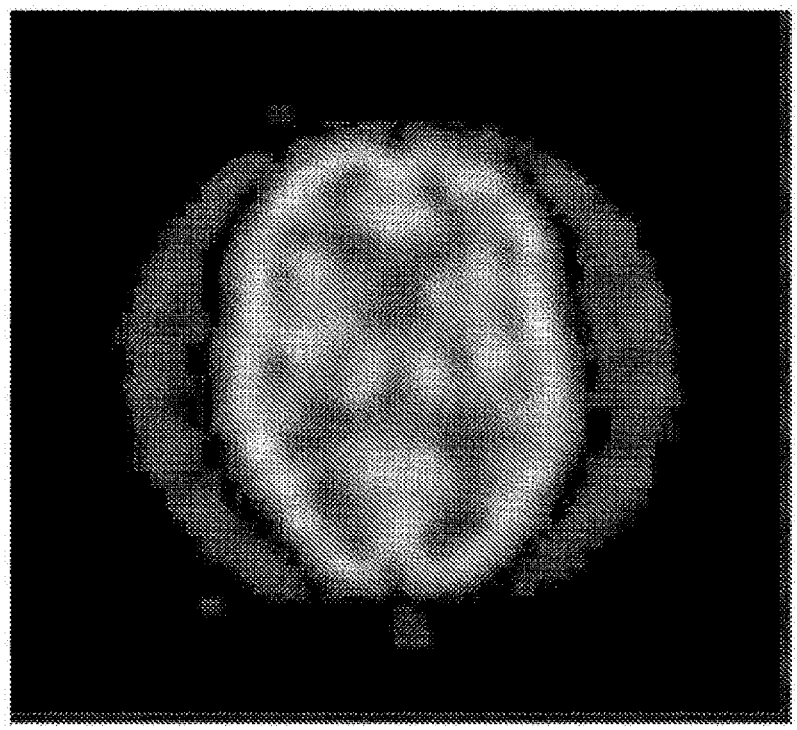
FIG. 5B is a reproduction of a SPECT scan of the same head phantom shown in FIG. 5A, scanned according to some embodiments of the invention.

FIG. 5A is a SPECT scan of a head phantom, scanned with allocating scanning time to different detector configurations regardless of differences in the visibility of different portions of the brain (which was the region of interest) to the detector. FIG. 5B is a SPECT scan of the same head phantom, scanned for the same total scanning time, but with scanning time allocated to different detector configurations based on the visibility of the center of the brain to the detector. It may be seen that in FIG. 5B the center of the brain is imaged in higher quality than in FIG. 5A. The total scanning time for producing the scans shown in FIGS. 5A and 5B were the same.

FIG. 3A is an exemplary attenuation profile 300. Attenuation profile 300 comprises an image showing a low-resolution slice of a CT scan of a human chest. Some parts easily recognizable in the figure are the lungs, heart, and spine. In some embodiments, the region of interest may be defined by the outline of the chest, marked 302. The shading of different tissues in the figure is indicative of the attenuation coefficient of the respective tissues for the X-rays used for generating the image. The darker is a portion of the image, the lower is its X-ray attenuation, and the attenuation at the darkest parts, outside outline 302, is practically zero. As there is a straightforward transformation from attenuation of X-rays to attenuation of gamma radiation, the shading is also indicative of the gamma attenuation of the respective tissues.

FIG. 3B is an exemplary graph associating weights to swivel angles based on attenuation profile 300, for a configuration set at which the detector is at position 304. In some embodiments, the configuration set determines the distance of the detector from chest 300 by a degree of extension of an extendible arm carrying the detector (e.g., arm 1116 in FIG. 6A). In some embodiments, the configuration set determines the position of the detector, i.e., below the center of the chest, by a gantry angle (e.g., φ in FIG. 6A). The configuration set also includes a swivel angle (see arrow 1620 in FIG. 7A). In the exemplary graph shown in FIG. 3B the weight is determined for each swivel angle by integrating the attenuation coefficient along a line emerging from the detector's position 302 and directed according to the swivel angle to obtain an integrated attenuation. In the example shown, the weight is exponent of the integrated attenuation. In some embodiments, the weight may be the integrated attenuation, or any value derivable straightforwardly from the integrated attenuation or from the exponent of the integrated attenuation.

FIG. 3A includes two lines at about 70° and at about 100° (measured clockwise from horizontal line 306, and marked 310 and 311 respectively), and FIG. 3B includes two vertical dashed lines at the corresponding angles, marked with the same respective numerals. As can be seen, the maximum of the attenuation is along a line going through the middle of the heart, while lines going through the lungs (e.g., the line emerging at an angle of about 70°) have a smaller weight. In some embodiments, running a SPECT scan based on the weights shown in FIG. 3B results in spending no acquisition time at angles smaller than 30° or larger than 150°, while spending most of the time at angles between 80° and 120°. Spending more time detecting gamma radiation while facing regions of high attenuation may compensate for the relatively small amount of radiation emerging from these regions per second, so that the number of photons (or the amount of radiation) detected from any part of the ROI is substantially the same.

FIG. 3C is another exemplary attenuation profile, that includes an outline of an ROI, marked 302. The outline may be obtained, for example, by interpolating between positions of a plurality (e.g., 6 or 8) of detectors when they nearly touch the patient's body. In the attenuation profile of FIG. 3C, the entire area defined by outline 302 attenuates uniformly. This may be, for example, an approximation to an attenuation profile of a body part that includes only tissues of similar attenuation, such as muscle, fat, and bones. Like numerals used in FIGS. 3A and 3C refer to like parts.

Figure 3D:
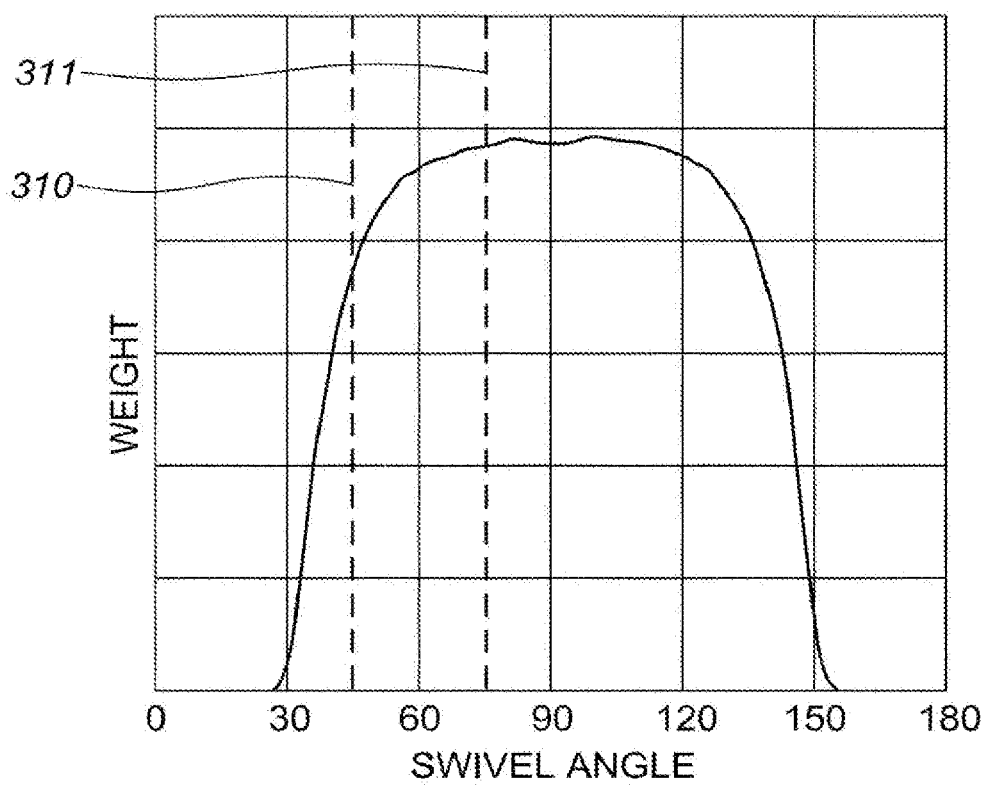
FIG. 3D is a graph showing the weights assigned to different swivel angles according to some embodiments of the invention.

FIG. 3D is an exemplary graph associating weights to swivel angles based on the attenuation profile of FIG. 3C. In the exemplary graph shown in FIG. 3D the weight is determined for each swivel angle by multiplying the attenuation coefficient of the ROI by a length of a line emerging from the detector's position 302 and directed according to the swivel angle.

FIG. 3C includes two lines at about 45° and at about 75° (measured clockwise from horizontal line 306, and marked 310 and 311, respectively), and FIG. 3D includes two vertical dashed lines at the corresponding angles, marked with the same numerals. As can be seen, the maximum of the attenuation is between about 60° and about 120°. In some embodiments, running a SPECT scan based on the weights shown in FIG. 3D results in spending no acquisition time at angles smaller than 45° or larger than 135°, while spending time mainly at angles between 80° and 120°.

FIG. 4A is a flowchart of an exemplary method 400 for determining a weight for a specific detector configuration based on an attenuation profile. Method 400 may include two main steps: step 402 includes determining an ROI visibility value for the detector configuration; and step 404 of determining the weight based on the visibility value.

Figure 4B:
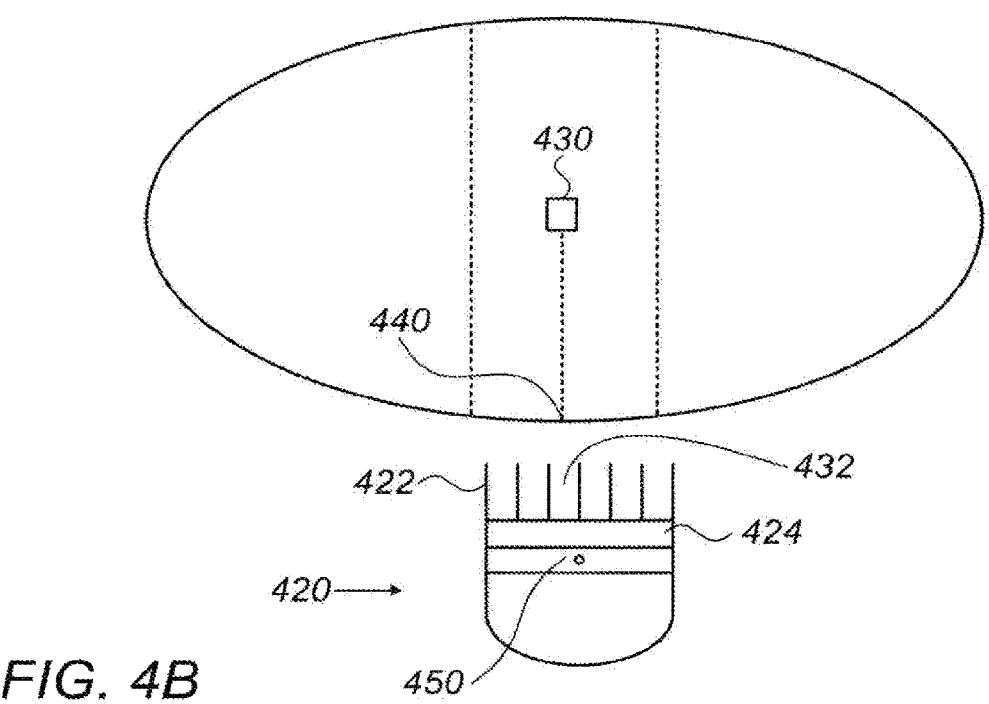
FIG. 4B is a diagrammatic illustration of a gamma detector.

To show how a visibility value may be determined for a detector configuration reference is made to FIG. 4B. In FIG. 4B a detector 420 is shown to include a parallel holes collimator 422, and a detecting crystal 424. The probability that photons emerging from a pixel 430 directly towards hole 432 in collimator 422 through ROI edge 440, are attenuated before reaching detecting crystal 424 may be given by equation (1):

$$P = e^{-\int_{R_1}^{R_2} \mu(l)dl} \quad (1)$$

Wherein P is the probability that a photon is attenuated, $R_1$ is ROI edge 440, $R_2$ is voxel 430, and $\mu(l)$ is the linear attenuation of the gamma photons in the ROI as a function of the location along a path going from voxel 430 to ROI edge 440. If the linear attenuation has a constant value along that path (or across the entire ROI, as illustrated in FIG. 3C), equation (1) may take a simpler form, given in equation (2)

$$P = e^{-\mu_0 \Delta l} \quad (2)$$

Wherein $\mu_0$ is the constant value of the linear attenuation, and $\Delta l$ is the length of the path going from voxel 430 to ROI edge 440.

In both cases, the probability that the photon is detected is given by equation (3)

$$P_{reaching\ the\ collimaor} = 1 - P \quad (3)$$

If the photon emerges in a different direction, it finds a septum on its way to detection crystal 424, and for the purpose of the present discussion is assumed to be 100% absorbed by the septum. So the probability of being detected of all photons that do not emerge directly into one of the holes is 0. In some embodiments, the probability to be absorbed by a septum is given a more precise (non-zero) value, and taken into account.

In some embodiments, a weight for a specific detector configuration is determined based on an estimation of a total attenuation from a point in the ROI (e.g., point 430) to a point in the gamma detector (e.g., point 450, which is in line with points 430 and 440, and makes part of detection crystal 424). In a similar way, a probability may be calculated for photons emerging in any direction from each and every voxel in the region of interest being detected by any point in the gamma detector.

These probabilities may be combined to generate a weight. In some embodiments, the combination may be based on summing. For example, in some embodiments, the visibility of the ROI to the detector in the given detector configuration may be defined as the sum of the probability of being detected of photons emerging from each and every voxel in the region of interest in any available direction. In some embodiments, the sum is not over each and every voxel, but over some selected voxels. In some embodiments, the probability to be detected despite of going through one or more septa of collimator 422 is taken into account more accurately than in the above-described process, where it was assumed to be 0. In some embodiments, not all the directions along which photons may emerge are taken into account, but only some of the directions. When only some voxels are considered, the combination may include summation, for example weighted summation. For example, each voxel considered may be taken to represent a number of voxels, and may be weighted by this number.

In some embodiments, a probability distribution is calculated. The probability distribution may include probabilities to detect photons by different points across detection crystal 424. For example, in the multi-hole collimator illustrated in FIG. 4B, the probability distribution may include a separate probability to detect photons for each detector cell corresponding to one of the holes. In some such embodiments, the weight is determined as an order statistic of this distribution (e.g., the maximum, median, etc.)

Once a visibility value is determined for the detector configuration, for example, in any of the manners described above, a weight for the detector configuration may be calculated based on it. For example, in some embodiments, the weight associated with a detector configuration may be the visibility value determined for that detector configuration. In some embodiments, the weight may be indicative of the visibility value, for example, the visibility value multiplied by some factor, which may be equal for all the detector configurations or may differ between detector configurations. For example, the factor may be different for detector configurations facing regions of different levels of importance. For example, if some portion of the ROI is of special interest, and there is a need to image it with a higher quality, the factor multiplying the visibility value of detector configurations facing the region of special interest may be higher than a factor doubling the visibility value of detector configuration that do not face the region of special interest.

As mentioned above, in some embodiments, acquisition time periods may be allocated among the detector configurations based on the weights determined. In some embodiments this is done by dividing a total acquisition time among a number of discrete configurations, and allocating to each detector configuration a time period proportional to its weight. The proportionality factor may be determined by first determining a target scanning time, and then dividing the target scanning time by a sum of the weights associated with all the detector configurations. In such examples, the weights correspond to acquisition durations.

For example, in some embodiments, multiple detector configurations (e.g., first, second, third, etc.) are determined to be used for the scanning before scanning begins. Then, the gamma detector is brought to the first configuration, and gamma radiation is detected for a time period corresponding to the weight determined for the first configuration. When that time period ends, the detector is brought to the second configuration, and gamma radiation is detected for a time period corresponding to the weight determined for the second configuration, and so on, until detection has been carried out from each of the multiple detector configurations.

In some embodiments, the weights may be used to determine sweeping paces. The sweeping may be of the detector along different configurations. In some such embodiments, the detector moves fluently from one configuration to the other in pace that may be controlled and changed during detection. The sweeping pace may be determined by the weights. For example, consider a case where detection is to be carried out at all swiveling angles between 30° and 150° and weights have been determined only to some these endless number of swiveling angles, e.g., swiveling angles of 30°, 60°, 90°, 120°, and 150°. The detector may be swiveled fluently between 30° and 150°, and the swivel pace may change during swiveling based on the weights determined for the different swivel angles. For example, in some embodiments, the swivel pace between 30°, and 60° may correspond to the weight determined for 30°; the swivel pace between 60°, and 90° may correspond to the weight determined for 60°, etc. In some embodiments, the swivel pace between 30° and 90° may correspond to the weight determined for 60°, and the swivel pace between 90° and 150° may correspond to the weight determined for 120°. In some embodiments, the swivel pace between 30°, and 60° may correspond to an average of the weight determined for 30° and the weight determined for 60°, etc.

More generally, sweep paces may be determined based on weights determined for configurations within the sweep and/or configurations between which the sweeps occur. In some embodiments, the sweeping stops before sweeping pace is changed, so the sweep is made of a plurality of discrete sweeps, each of which being fluent by its own. In some embodiments, there is no stop, and the sweep is continuous.

In some embodiments, the weight associated with a detector configuration may be used to determine a configuration density in the vicinity of the detector configuration. For example, in some embodiments, higher weight corresponds to higher configuration density. For example, the detector may spend the same time duration at each configuration, but stays at more configurations in the vicinity of a configuration associated with higher weight than in the vicinity of a configuration associated with lower weight.

The vicinity of a configuration may be determined, in some embodiments, based on distances in a configuration space. The configuration space may be one-dimensional, e.g., when only one configuration defining parameter (e.g., swivel angel or gantry position) is changed. The configuration space may be multi-dimensional, in which case the vicinity may be defined based on the distance between the configurations in a multi-dimensional space. The vicinity may be defined as a certain distance, and the number of configurations used for scanning within a sphere having a radius (or diameter) of the certain distance may be determined according to a weight determined for a configuration at the center of the sphere. In some embodiments, different distances may be determined along different configuration defining parameters, for example, a non-selected configuration may be considered in the vicinity of a selected configuration if the two are within a certain distance in swivel angle (e.g., 20°) and a certain (possibly different) distance in gantry angle (e.g., 10°).

FIG. 6A is a diagrammatic presentation of an exemplary apparatus 1100 for scanning a region of interest (ROI). Apparatus 1100 includes a support (1102), a gantry (1104), 4 3D sensors 1106, and a processor (1108).

Support 1102 is configured to support patient 1110 during imaging. The patient support may be configured to support lying patients, as illustrated. In some embodiments, the patient support may be configured to support standing patients, sitting patients, and/or leaning patients. For example, the support may be horizontal, such as a patient bed, vertical, such as a wall or a back of a chair and the like. The support may be made of low attenuation material, for refraining from attenuating gamma radiation emanating from the patient towards the detectors on the other side of the support.

Gantry 1104 includes a cylindrical frame that supports multiple gamma detectors 1112. In some embodiments, each gamma detector faces support 102. An example of a gamma detector is described below in relation to FIG. 7A and FIG. 78. Each detection head 1112 may be mounted on an extendable arm 1116, configured to take the detection head mounted on it in a linear in-out movement, so as to bring the detector closer to the patient or away of it. Gantry 1104 is rotatable around an axis, along, for example, angle φ, to allow the gamma detectors to rotate around the support.

Each detection head 1112 may include a semiconductor detecting crystal, for example cadmium zinc telluride (CZT) detecting crystal. A linear actuator is provided to linearly maneuver extendable arm 1116 so that detection head 1112 moves toward and from patient support 1102. Optionally, the linear actuator is mechanical actuator that converts rotary motion of a control knob into linear displacement, a hydraulic actuator or hydraulic cylinder, for example a hollow cylinder having a piston, a piezoelectric actuator having a voltage dependent expandable unit, and/or an electro-mechanical actuator that is based on an electric motor, such a stepper motor and the like. In some embodiments, the linear actuator may include a stepper motor and a sensor, optionally a magnetic sensor (e.g., encoder) that senses the actual position of detection head 1112, to provide feedback on the control of the stepper motor. The control of each linear actuator may be performed according to a scanning plan. In some embodiments, the scanning plan may be generated by processor 1108. In some embodiments, the scanning plan may be generated outside apparatus 1100, and imported to the processor. Regardless of the origin of the plan, processor 1108 may control other parts of the apparatus to carry out the plan. The scanning plan may include, for example, a list of detector configurations for each of the detectors, and a time to dwell at each configuration. A configuration may be defined, for example, by angle of gantry 1104, the extension of extendable arm 1116, and a swiveling angle of the detection head 1112.

Each sensor 1106 is a 3D sensor arranged to sense a portion of patient 1110 when the patient is supported by support 1102. These optional sensors may provide data to delimit the region of interest, and this data may be used in generating an attenuation profile, for example, having an attenuation of water in the region of interest, and of air out of the patient, for example, as described in FIG. 3C herein. Each sensor 1106 may be, for example, optical, ultrasonic, or based on radio waves or microwaves. Examples of specific technologies used in such sensors are structured light sensors, illumination assisted stereo sensors, passive stereo sensors, radar sensors, Lidar sensors, and time of flight sensors. Commercially available embodiments of such sensors include Microsoft Kinect, Intel RealSense Camera F200, Mantis Vision's 3D scanners, PMD technologies PicoFlexx, and Vayyar imaging Walabot. Sensor 1106 is configured to output signals indicative of 3D coordinates of points (e.g., point 1114, 1114') on an outer surface of patient 1110 and/or support 1102. In some embodiments, the 3D sensor(s) provides a point cloud that allows approximating the outer surface of the bed and/or patient. In some embodiments, the 3D sensor may be installed on the gantry, as shown in FIG. 6. Alternatively or additionally, one or more 3D sensors may be installed on the extendable arm 1116, inside detection head 1112, on a separate support structure, or at any other location, at which the one or more 3D sensors can sense the position of at least one point of the outer surface of the patient and/or support.

Processor 1108 may be configured to determine for each of detector configuration, a respective weight; and allocate among the detector configurations time periods based on the determined weights, thereby generating a scanning plan. Processor 1108 may be further configured to control other parts of the apparatus to scan according to the scanning plan generated, for example, the processor may control gantry 1104, extendable arms 1116, and the swivel angle of the detector in each of the detection heads 1112, so that gamma radiation is detected by each gamma detector at each detector configuration for the time period allocated to the respective detector configuration. The determination of the weights by processor 1108 may be based on an absorption profile, associating each of a plurality of portions of the ROI with a respective gamma attenuation value, for example, an absorption profile of the kind illustrated in FIG. 3A. Processor 1108 may be configured to control the detectors concertedly, for example, to avoid interference between the detectors, and to use each of the detectors for scanning a different portion of the ROI, so that the detectors together scan the entire ROI in less time than it would have been scanned by a single detector. Nevertheless, the invention is not limited to any number of detectors, and in some embodiments, a single detector may do.

As used herein, if a machine (e.g., a processor) is described as "configured to" perform a particular task (e.g., determine weights), then the machine includes components, parts, or aspects (e.g., software) that enable the machine to perform the particular task. In some embodiments, the machine may perform this task during operation. Processor 1108 is diagrammatically described in FIG. 6B. Processor 1108 may include an input 1202 configured to receive from 3D sensor 1106 data indicative of at least one surface point 114. The data received from the processor may be raw data, convertible to 3D coordinates of the one or more surface points by processor 1108 or any processing module connected to processor 1108. In some embodiments, the 3D sensors may send the coordinates directly to processor 1108. Data indicative of the 3D coordinates of the one or more surface points may be stored in memory 1204, and may be used by processor 1108 to generate an absorption profile of the kind illustrated in FIG. 3B, for example, to generate the outer shape of the ROI (see curve 302) based on the input from the 3D sensors, and attribute to all points within the curve a predetermined attenuation value. The predetermined attenuation value may be pre-programmed into processor 1108, and stored, for example, on memory 1204, further described below. In some embodiments, input 1202 may be configured to receive a scan (e.g., a CT scan) of the region of interest and different values of linear attenuation parameters associated with different portions of the scanned ROI, for example, as described in the context of FIG. 3A. The scan may be taken by a scanner integrated with apparatus 1100 into a dual modality scanner. The absorption profile (regardless what data it is based on), may be stored on memory 1204. In some embodiments, the detectors may be brought as close as possible to the patient around the ROI, and the outline of the ROI may be determined based on the location of the detectors. The volume within the outline may be assumed to absorb in a certain manner (e.g., uniformly as if completely filled with water, or one part as water and another part as a patient bed, etc.). The absorption profile may be calculated based on the volume outline and its assumed absorption, and stored on memory 1024.

Processor 1108 may further include a memory 1206 storing instructions for determining weights based on input received through input 1202. Memory 1206 may be separate from memory 1204, or may make part of memory 1204. An example of a method by which processor 1108 may determine the weights is described in FIG. 4A. Processor 1108 may further include a central processing unit (CPU) 1208 configured to carry out the instructions saved on memory 1206 using data stored on memory 1204 and send results of the processing to output 1210.

Output 1210 may be connected to a motor (not shown) moving gantry 1104, to motors moving extendable arms 1116, and to motors moving the detectors inside the detection heads to the appropriate swivel angles, in accordance to the weights determined to the various detector configurations based on data received through input 1202 and instructions stored on memory 1206.

System 1100 may also include a user interface 1214. User interface 1214 may allow the user (for example, a technologist) to indicate a kind of scan to be performed. The user interface may include, for example, a barcode reader to read a barcode attached to an imaging request for the patient. Optionally or alternatively, the user interface may include a keyboard, touchscreen, or any other input device allowing the user to indicate the kind of scan required. In some embodiments, user interface 1214 may be configured to allow a user to manually indicate a portion of the ROI where high image quality is most desired. For example, user interface 1214 may include a display for displaying an image of the ROI. The image may be, for example, a SPECT preview scan or an image taken with a different modality (e.g., a CT scan, MR image, ultrasound image). The displayed image may show the ROI at low quality, a scan taken at a different occasion (e.g., a few months before), etc. The display may include a touchscreen, mouse, or any other arrangement allowing a user to point to a certain region in the displayed image. Once an indication has been received, that a certain region is to be imaged at higher quality than others, this may be taken into consideration in assigning weights to detector configurations. For example, higher weights may be assigned to detector configurations that the indicated region is within their field of view.

In some embodiments, details of the required scan may be inputted from another computer, e.g., through an intranet or through the Internet. Such input may be in addition to, or instead of, input from user interface 1214.

Figure 7A:
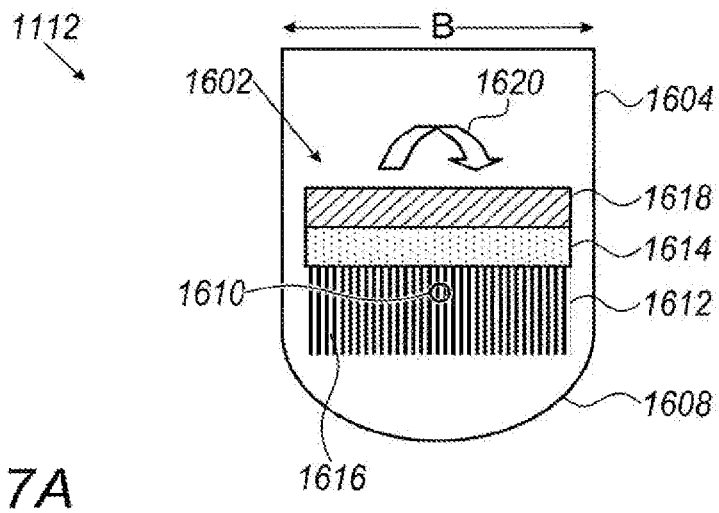
FIG. 7A is a cross-sectional illustration of a gamma detector according to some embodiments of the invention.

FIG. 7A is a cross-sectional illustration of a detection head 1112 according to some embodiments of the invention. Detection head 1112 has a breadth 8, length L and height H (see FIG. 7B for the length L and height H). Detection head 1112 may include a detecting unit 1602 in a housing 1604. For example, the detecting units 1602 may be housed to protect patient 1110 from swivel motion (illustrated by the arrow 1620) of the detecting unit 1602. Housing 1604 may have a round or curved cover. In some embodiments, housing 1604 includes a cover shaped with a section 1608 of a cylinder that allows for the swivel of the detecting unit 1602 around a swiveling axis 1610. Detection head 1112 is shown to include a parallel hole collimator 1612. Such a collimator may be used to gain information about the direction from which each photon arrives at the detection layer 1614. Collimator 1612 may include thin walls 1616 (also referred to as septa) that define channels parallel to each other. The walls may be made of materials that have high linear attenuation coefficient for gamma radiation, such as lead or tungsten. Each photon may be considered to arrive to a point where it hits detection layer 1614 through a channel of the collimator. Most of the photons that hit septa 1616 are absorbed by the septa, so that mainly photons that go nearly perpendicularly to detection layer 1614 reach the detection layer. The near perpendicularity may be expressed as a solid angle, from which the photons have to emerge in order to have a high probability (e.g., larger than 90%) to reach the detection layer. Detecting unit 1602 may also include heat sink 1618, which may be attached to the detection layer on the detection layer side that is free of collimator 1612. Detection head 1112 may also include electronics (not shown) for transferring data to and from the detection layer to processor 1108.

While the explanations above refer to a collimator known in the field as a parallel hole collimator, one or more of collimators 1612 may be of a different kind, for example, a pinhole collimator, a slant hole collimator, or a fan beam collimator (e.g., a converging collimator, or a diverging collimator). In some embodiments, different detectors 1112 may include collimators of different kinds.

Detection head 1112 may include further parts, as well known in the field. For example, the detection layer 1614 may include a plurality of detection modules, and each may have its own ASIC. The gamma detector may further include a carrier board which holds all of the detection modules, and interfaces to the ASICs. The gamma detector may also include shielding from external radiation, and additional mechanics to hold the detection layer, ASICs, electronics, cover, etc., together. The gamma detector may also include a swivel motor, a swivel axis, belt, tensioners, encoder for encoding the exact swivel angle, electronic boards to control the motion of the detector with the gamma detector and/or inside the gamma detector, and electronic boards to transfer data indicative of the photons received at the detection layer.

Figure 7B:
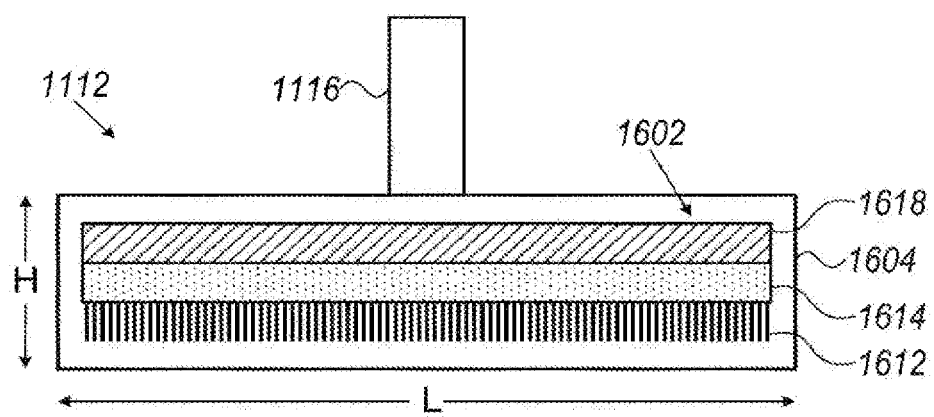
FIG. 7B is an illustration of a different cross-section in the gamma detector shown in FIG. 7A.

FIG. 7B is a cross-sectional illustration of the detector shown in FIG. 7A along a cross-section perpendicular to that depicted in FIG. 7A. FIG. 7B illustrates that in some embodiments detector 1112 may be elongated, for example, to almost contact with the patient along a line parallel to the longitudinal axis of the patient. The length of the detector may be sufficient to allow acquiring the entire scan without moving the patient (or the gantry) along the patient, and yet short enough to allow maximal proximity between the detector and the patient taking into account body curvatures. A length of about 30 cm to 40 cm is found to be satisfactory for imaging grown up humans. FIG. 6B also shows extendable arm 1116. In some embodiments, the angle between extendable arm 1116 and detector 1112 is fixed, e.g., as 90°. In some embodiments, the angle between extendable arm 1116 and detector 1112 may be controllable, e.g., by processor 1108. In some embodiments, the length of detector 1112 is about 30 cm, the length of the outer cover is about 40 cm, and the radius of curvature of the round part 1608 of cover 1604 is about 5 cm. The length of the cover may extend beyond the length of the detector, for example, to allow accommodation of electronics, encoders, and/or proximity sensors (all not shown).

Processor 1108 may be configured to determine for each of the multiple detector configurations of the gamma detector a respective weight based on an absorption profile. The absorption profile may be stored on memory 1204 which may make part of processor 1108 or may be accessible to processor 1108 in any other way. In some embodiments, the absorption profile may be received from outside apparatus 1100 via input 1202. For example, input 1202 may allow receiving an absorption profile generated independently of apparatus 1100, for example, by a CT scanner or any other modality, one or more days before scanning by apparatus 1100. In some embodiments, the absorption profile may be obtained based on a SPECT preview scan made by apparatus 1100, e.g., immediately before beginning scanning according to any of the above-mentioned methods. For example, the preview scan may be taken using a plurality of detector configurations, allocating a predetermined acquisition time to each of them. The predetermined acquisition time may be equal to all the detector configurations, or acquisition times may be allocated between configurations according to some heuristic rule, deduced from experience gained in scanning similar regions of interests in other patients. In some embodiments, the scanning time devoted to the preview scan may be short (e.g., 1 minute, 3 minutes, 5 minutes, or any duration longer than about 1 minute and shorter than about 10 minutes). Thus, in some embodiments, a user (e.g., a technologist or a physician) first operates apparatus 1100 to generate a preview scan of the ROI, and indicates to processor 1108 (e.g., via a user interface 1212) to use the preview scan for generating the absorption profile. For example, in some embodiments, the preview scan may be used for determining the outer contour of the body; and the absorption profile may be assumed to be uniform within the outer contour, for example, as if it was a body of water. In another example, in some embodiments, the preview scan may be matched to a model of the region of interest obtained offline, for example, a pre-acquired CT scan. The matching to the preview scan may be used to scale the CT scan, so that an absorption profile generated based on the CT may be scaled and/or oriented to the current dimensions and/or orientation of the patient. Dimensions of the region of interest may change, for example, due to different levels of hydration of the patient. Orientation of the patient may change, for example, if the preview image and the CT image were taken with the patient at different postures, even if the difference between the postures is small.

In some embodiments, apparatus 1100 also includes means for obtaining the absorption profile. For example, apparatus 1100 may include one or more 3D sensors 1106 configured to provide data indicative of coordinates of points on the outer surface of the region to be scanned. Processor 1108 may be configured to generate a model of the outer surface of the ROI based on data received from 3D sensor(s) 1106, for example, by triangulation. Once a model of the outer surface of the ROI is generated, the absorption profile may be obtained by assuming that the volume closed by the outer surface is characterized by a uniform absorption coefficient, e.g., the absorption coefficient of water in the energy range of the gamma radiation to be used for the gamma scanning (pa). In some embodiments, some portions of the volume may be assumed to be characterized by absorption coefficient(s) other than that of water, for example, if the ROI includes, at a known position in respect to the outer surface, an air duct (for example, a feeding tube), a metal part (e.g., a prosthesis), or a tissue of known characteristic absorption coefficient. Obtaining the absorption profile may include assigning to one or more portions of the ROI absorption coefficient(s), for example, based on one or more of the above assumptions.

In addition to 3D sensor(s) 1106, or instead thereof, apparatus 1100 may include a CT scanner (not shown). The CT scanner may provide a CT scan of the ROI (e.g., of the kind illustrated in FIG. 3A). The CT scanner may provide the absorption profile in a straightforward manner. For example, the CT may measure linear attenuation at the X-rays used for the CT scan, and this may be converted to linear attenuation for gamma rays, used for the SPECT.

In addition to 3D sensor(s) 1106, to the CT scanner, or as an alternative to one of them or to both, apparatus 1100 may include an MRI scanner (not shown), configured to provide processor 1108 with data, from which the absorption profile may be generated by the processor. For example, processor 1108 may be configured to analyze an MRI scan to obtain the absorption profile. In some embodiments, the MRI may be used to identify locations of different kinds of tissue (e.g., bone, fat, muscles, air, etc.), and assign attenuation coefficients to locations based on the kind of tissue identified.

As mentioned above, processor 1108 may be configured to determine for each of the multiple detector configurations of the gamma detector a respective weight based on the absorption profile. The determination of the weights may, in some embodiments, include associating each of a plurality of detector configurations with a visibility value.

Processor 1108 may be further configured to control gamma detector 606 to detect gamma radiation from multiple detector configurations based on the weights determined. For example, in some embodiments, processor 1108 may be configured to control the gamma detector to devote more time to detecting gamma radiation when facing the ROI from a direction along which attenuation between the gamma detector and the ROI is higher (or visibility of the ROI is lower) than to detecting gamma radiation when facing the ROI from a direction along which attenuation between the gamma detector and the ROI is lower (or visibility of the ROI is higher).

In some embodiments, the weights correspond to acquisition durations. In some embodiments, the processor may be configured to generate a scanning program, including all detector configurations to be used, and for how long gamma radiation is to be detected at each configuration, and then carries out this scanning program.

For example, in some such embodiments, the processor is configured to bring the gamma detector to a particular detector configuration (e.g., by controlling movements of an extendible arm on which the gamma detector is mounted); and control the gamma detector to detect gamma radiation for the acquisition duration that corresponds to the weight determined for the particular detector configuration. The processor may be further configured to bring the gamma detector to a new configuration, and control the detector to detect gamma radiation at the new configuration for an acquisition duration that corresponds to the weight determined to the new configuration. This process may continue until the detector has detected gamma radiation from multiple configurations. In embodiments wherein a scanning program has been generated, the above process of bringing to configuration and detecting there may be carried out according to the scanning plan, until detection took place at all planned configurations.

In some embodiments, the weights correspond to sweeping paces, and the processor is configured to control the gamma detector to sweep continuously among multiple detector configurations at paces based on the weights. In some such embodiments, the processor is configured to control the gamma detector to sweep continuously among a first plurality of detector configurations at a first sweeping pace, and sweep continuously among a second plurality of detector configurations at a second sweeping pace. In some embodiments, there may be more than two pluralities of detector configurations, and each may be associated with a respective sweeping pace.

In some embodiments, the weights may correspond to detector configuration density. For example, weights may be determined for some detector configurations, referred herein as selected detector configurations. In operation, gamma radiation may be detected also in additional detector configurations, referred herein as non-selected configurations. The non-selected detector configurations may be in the vicinity of the selected one, for example, each selected configuration may have in its vicinity a number of non-selected configurations. This number may be determined by the weight. In operation, gamma radiation is detected from all the configurations, selected and non-selected alike. Assuming configurations that close to each other have similar visibility values, weights corresponding to detector configuration density (i.e., to the number of non-selected configurations used in the vicinity of each selected configuration), make it possible to allocate for each configuration the same acquisition duration, and still allow spending different acquisition times for detection from configurations with different visibility of the ROI. In some embodiments, the selected configurations may be equally distanced from each other, for example, each may differ from the adjacent one by the same distance, for example, by the same gantry angle difference, and/or by the same swivel angle difference.

Thus, in some embodiments, processor 1108 may be configured to execute the following in respect of each of multiple selected detector configurations:
  (a) bring the gamma detector to the selected detector configuration;
  (b) control the gamma detector to detect gamma radiation at the selected detector configuration;
  (c) bring the gamma detector to a non-selected detector configuration, the non-selected detector configuration being in the vicinity of the selected detector configuration;
  (d) control the gamma detector to detect gamma radiation at the non-selected detector configuration; and
  (e) repeat (c) and (d) a number of times, each with a different non-selected detector configuration in the vicinity of the selected detector configuration, said number being dependent on the weight determined for the selected detector configuration.

Repeating (a) through (e) for all the selected detector configurations results, at least in some selection of detector configurations, to spend different time imaging at configurations of average lower visibility than at configurations of average higher visibility even if the time allocated for each configuration is the same, for example, if the density of non-selected configurations differ among different selected configurations.

An exemplary method of scanning according to embodiments of the present disclosure includes scanning a region of interest (ROI) by detecting gamma radiation for a first time duration by a first detector that faces the ROI from a first direction; and for a second time duration by a second detector that faces the ROI from a second direction. The first and second detectors may be different detectors or the same detector. In the present example, the first duration is longer than the second duration when attenuation of gamma radiation between the gamma detector and the ROI is higher along the first direction than along the second direction. In other words, the lower is the visibility value of the detector configuration, the longer is the time spent on scanning at that configuration. This may be achieved based on a predetermined attenuation profile, based, for example, on a preview scan. However, in some embodiments, the attenuation profile may be generated during the scan, for example, the detector may be controlled to detect radiation from the ROI for a given, constant, time period at each configuration, and based on the radiation detected during this time period decide if to change detector configuration or to keep detecting radiation for an additional time period at this configuration. In some embodiments, the duration of the additional time period may be determined based on the amount of radiation detected during the first time period.

Another exemplary method of scanning may include detecting the gamma radiation while the gamma detector moves among detector configurations; and controlling the movement of the gamma detector to be faster (i.e. higher speed) when attenuation of gamma radiation between the gamma detector and the ROI is low than when attenuation of gamma radiation between the gamma detector and the ROI is high.

In some embodiments, the movement of the gamma detector among the detector configurations is continuous. In some embodiments, the movement may include bringing the detector to a plurality of distinct detector configurations, and detecting gamma radiation for a predetermined period with the detector in each of the distinct radiator configurations, where different speeds in the preceding example are achieved by having different densities of detector configurations: the higher the density—the slower is the movement. Again, slower movement is devoted to detecting radiations from detector configurations with lower visibility of the ROI. That is, in some embodiments, the plurality of distinct detector configurations is arranged with denser detector configurations in regions where attenuation of gamma radiation between the gamma detector and the ROI is high than when attenuation of gamma radiation between the gamma detector and the ROI is low.

Although the invention has been described in conjunction with specific embodiments thereof, it is evident that many alternatives, modifications and variations will be apparent to those skilled in the art. For example, the apparatus described in FIGS. 6A and 6S may be replaced by any other apparatus capable of SPECT imaging by one or more detectors from a plurality of detector configurations, and allows different time allocations to different detector configurations. In another example, the gamma detector described in FIGS. 7A and 7B may be replaced by any other gamma detector. Accordingly, it is intended to embrace all alternatives, modifications and variations of parts, methods, systems, or any embodiments described herein, as long as the alternatives, modifications and variations fall within the scope of the appended claims.

It is expected that during the life of a patent maturing from this application many relevant methods for scanning a region of interest by one or more gamma detectors will be developed; the scope of the term scanning a region of interest by gamma detector(s) is intended to include all such new technologies a priori.

As used herein with reference to quantity or value, the term "about" means "within ±10% of".

The word "exemplary" is used herein to mean "serving as an example", and not necessarily as "extremely good".

The terms "high" and "low" are used to indicate that the "high" is higher than the "low". Similarly, the terms "higher" and "lower" are used herein to mean higher than the one referred to as "lower", and lower than the one referred to "higher", respectively.

The terms "comprises", "comprising", "includes", "including", "has", "having" and their conjugates mean "Including but not limited to".

As used herein, the singular forms "a", "an" and "the" include plural references unless the context clearly dictates otherwise. For example, the term "a processor" or "at least one processor" may include a plurality of processors, packaged together or separately.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A method of scanning, by a gamma detector, a region of interest (ROI), the method comprising:
   detecting gamma radiation for a first time duration by a first gamma detector that faces the ROI from a first direction; and
   detecting gamma radiation for a second time duration by a second gamma detector that faces the ROI from a second direction,
   wherein the first time duration is longer than the second time duration when attenuation of gamma radiation between the gamma detector and the ROI is higher along the first direction than along the second direction.

2. The method of claim 1, wherein the second detector is the first gamma detector.

3. A method of scanning, by a gamma detector, a region of interest (ROI), the method comprising:
   detecting gamma radiation with a gamma detector while the gamma detector moves among detector configurations; and
   controlling the movement of the gamma detector to be faster when attenuation of gamma radiation between the gamma detector and the ROI is low than when attenuation of gamma radiation between the gamma detector and the ROI is high.

4. The method of claim 3, wherein the movement of the gamma detector among the detector configurations is continuous.

5. The method of claim 3, wherein controlling the movement comprises bringing the gamma detector to a plurality of distinct detector configurations, and detecting gamma radiation for a predetermined period with the detector in each of the distinct radiator configurations.

6. The method of claim 5, wherein plurality of distinct detector configurations is arranged with denser detector configurations in regions where attenuation of gamma radiation between the gamma detector and the ROI is high than when attenuation of gamma radiation between the gamma detector and the ROI is low.

7. An apparatus for scanning a region of interest (ROI), the apparatus comprising:
   a first and a second gamma detectors; and
   a processor configured to:
      detect gamma radiation for a first time duration by the first gamma detector that faces the ROI from a first direction; and
   detect gamma radiation for a second time duration by the second gamma detector that faces the ROI from a second direction;
   wherein the first time duration is longer than the second time duration when attenuation of gamma radiation between the gamma detector and the ROI is higher along the first direction than along the second direction.

8. An apparatus for scanning a region of interest (ROI), the apparatus comprising:
   a gamma detector; and
   a processor configured to:
      detect gamma radiation with the gamma detector while the gamma detector moves among detector configurations; and
   control the movement of the gamma detector to be faster when attenuation of gamma radiation between the gamma detector and the ROI is low than when attenuation of gamma radiation between the gamma detector and the ROI is high.

9. The apparatus of claim 8, wherein the processor controls the gamma detector to sweep continuously among the detector configurations.

10. The apparatus of claim 3, wherein the processor controls the movement by bringing the gamma detector to a plurality of distinct detector configurations, and detects gamma radiation for a predetermined period with the detector in each of the distinct radiator configurations.

11. The apparatus of claim 9, wherein plurality of distinct detector configurations is arranged with denser detector configurations in regions where attenuation of gamma radiation between the gamma detector and the ROI is high than when attenuation of gamma radiation between the gamma detector and the ROI is low.

* * * * *